(12) United States Patent
Tatsumi et al.

(10) Patent No.: US 10,427,245 B2
(45) Date of Patent: Oct. 1, 2019

(54) PRODUCTION METHOD FOR WELDED STRUCTURE

(71) Applicant: NIPPON STEEL & SUMITOMO METAL CORPORATION, Tokyo (JP)

(72) Inventors: Yujiro Tatsumi, Tokyo (JP); Hiroki Fujimoto, Tokyo (JP); Masanori Yasuyama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 131 days.

(21) Appl. No.: 15/123,504

(22) PCT Filed: Apr. 3, 2015

(86) PCT No.: PCT/JP2015/060610
§ 371 (c)(1),
(2) Date: Sep. 2, 2016

(87) PCT Pub. No.: WO2015/152402
PCT Pub. Date: Oct. 8, 2015

(65) Prior Publication Data
US 2017/0072508 A1    Mar. 16, 2017

(30) Foreign Application Priority Data

Apr. 4, 2014    (JP) ................................ 2014-078075

(51) Int. Cl.
*B23K 26/14*    (2014.01)
*B23K 26/26*    (2014.01)
(Continued)

(52) U.S. Cl.
CPC ............ *B23K 26/14* (2013.01); *B23K 26/146* (2015.10); *B23K 26/147* (2013.01); *B23K 26/26* (2013.01);
(Continued)

(58) Field of Classification Search
CPC ...... B23K 26/24; B23K 26/26; B23K 26/125; B23K 26/1437; B23K 26/14;
(Continued)

(56) References Cited

U.S. PATENT DOCUMENTS

| 2005/0000951 A1* | 1/2005 | Nakai .................. B23K 26/123 |
| | | 219/121.64 |
| 2007/0119830 A1 | 5/2007 | Meier |
| 2011/0174786 A1 | 7/2011 | Lefebvre et al. |

FOREIGN PATENT DOCUMENTS

| JP | 5-208290 A | 8/1993 |
| JP | 2002-263878 A | 9/2002 |

(Continued)

OTHER PUBLICATIONS

International Search Report (PCT/ISA/210) issued in PCT/JP2015/060610, dated Jul. 7, 2015.
Written Opinion (PCT/ISA/237) issued in PCT/JP2015/060610, dated Jul. 7, 2015.

*Primary Examiner* — Christopher S Kim
(74) *Attorney, Agent, or Firm* — Birch, Stewart, Kolasch & Birch, LLP

(57) ABSTRACT

A method of production of a welded structure by butt welding two steel sheets (51, 52) by laser welding (11) while supplying assist gas (12) to a back surface of a melt pool (13), whereby it is possible to prevent formation of a through hole in the melt part (53), characterized in that a thickness of at least one steel sheet (52) of the two steel sheets (51, 52) is 0.6 mm or less, the assist gas (12) is a mixed gas (12) containing 10 to 50 vol % of $O_2$ gas, and, when an $O_2$ concentration in the mixed gas (12) is C (vol %), a flow rate L of mixed gas (12) (liter/min) satisfies 30 (liter/min)−C(vol %)×1 (liter/min/vol %)≤L (liter/min)<40 (liter/min).

14 Claims, 3 Drawing Sheets

(51) Int. Cl.
  *B23K 26/146* (2014.01)
  *B23K 26/32* (2014.01)
  *B23K 103/04* (2006.01)
  *B23K 101/18* (2006.01)

(52) U.S. Cl.
  CPC ........ *B23K 26/32* (2013.01); *B23K 2101/185* (2018.08); *B23K 2103/04* (2018.08)

(58) Field of Classification Search
  CPC .. B23K 26/062; B23K 26/146; B23K 26/147; B23K 26/32; B23K 2201/185; B23K 2203/04
  USPC ............. 219/121.63, 121.64, 121.84, 121.62
  See application file for complete search history.

(56) References Cited

FOREIGN PATENT DOCUMENTS

| | | |
|---|---|---|
| JP | 2003-154476 A | 5/2003 |
| JP | 2004-136329 A | 5/2004 |
| JP | 2005-021968 A | 5/2004 |
| JP | 2005-021968 A | 1/2005 |
| JP | 2006-021216 A | 1/2006 |
| JP | 2006-187811 A | 7/2006 |
| JP | 2007-237216 A | 9/2007 |
| JP | 2014-113598 A | 6/2014 |
| KR | 10-2011-0073466 A | 6/2011 |

* cited by examiner

PRODUCTION METHOD FOR WELDED STRUCTURE

TECHNICAL FIELD

The present invention relates to a method of production of a welded structure, more particularly relates for example to a method of production of a welded structure such as a tailored blank material which uses butt laser welding of steel sheets.

BACKGROUND ART

In the field of steel sheet for automobile use, to lighten the weight for improving fuel efficiency and to improve the impact resistance, application of tailored blanking has been spreading. "Tailored blanking" means the process of press-forming a sheet member comprised of a plurality of metal sheets differing in material, thickness, tensile strength, etc. joined by butt welding (below, "tailored blank material") into a desired shape. For the butt welding when producing the tailored blank material, laser welding is generally used.

PLTs 1 to 3 disclose methods of butt welding using laser welding so as to produce a tailored blank material.

CITATION LIST

Patent Literature

PLT 1. Japanese Patent Publication No. 2005-21968A
PLT 2. Japanese Patent Publication No. 2006-187811A
PLT 3. Japanese Patent Publication No. 2007-237216A

SUMMARY OF INVENTION

Technical Problem

In the past, as the thickness of the metal sheets used for producing a tailored blank material, 0.7 mm or so was the lower limit. In PLTs 1 to 3 as well, the thicknesses of the steel sheets disclosed in detail in the examples were as thin as 0.7 mm.

To further lighten the weight of automobiles, reducing the thickness of the metal sheets used when producing a tailored blank material has been studied. Due to this, application of thinner steel sheets which have not been used for the production of tailored blank materials and for which welding techniques have not been studied has become desired.

The inventors engaged in studies for application of thin steel sheets to tailored blank materials. As a result, they clarified that if using steel sheets of a thickness of 0.6 mm or less on an actual production line for butting welding by laser welding, even if the gap between steel sheets is a small 0.1 mm or less (including case of no gap), the problem arises of a through hole being formed at the melt part. However, PLTs 1 to 3 relating to tailored blank materials using mainly thickness 0.7 mm or more steel sheets do not report the problem of a through hole. That is, means for dealing with this have not yet been studied.

The present invention was made to solve the above problems and has as its object the provision of a method of production of a welded structure enabling prevention of the formation of a through hole at a melt part even when butt welding a plurality of steel sheets including thickness 0.6 mm or less steel sheets.

Solution to Problem

The inventors etc. engaged in intensive studies on the factors influencing the formation of a through hole at a melt part. As a result, they obtained the following findings:

A through hole is formed at a melt part due to a disturbance of the flow in the melt pool at the time of welding. The stability of flow of a melt pool is greatly influenced by the type of the assist gas.

When performing laser welding, the lower limit of laser output not resulting in insufficient heat input is made the lower limit output, the upper limit of the laser output where the energy becomes excessive and a through hole is formed is made the upper limit output, and the range between the lower limit output and upper limit output is made the suitable output range. When using assist gas comprised of the generally used Ar gas, suitable butt welding cannot be performed no matter what the laser output.

When not using any assist gas at all, butt welding is possible. However, sometimes the flow in the melt pool is disturbed, so a through hole sometimes forms. Stable control in actual operation is difficult.

When using an assist gas comprised of a mixed gas containing a suitable flow rate of $O_2$ gas, the formation of a through hole can be suppressed. The mechanism behind the suppression of formation of a through hole by $O_2$ gas is not clear, but can be guessed to be due to the following factors.

When supplying a mixed gas containing $O_2$ gas to a melt part, compared with when blowing Ar gas, the tension at the back surface of the molten metal falls. For this reason, a fine, sharp shape of a keyhole is stably formed. Due to this, a flow with little disturbance is obtained and as a result, it is considered, formation of a through hole can be stably suppressed.

On the other hand, when using an assist gas comprised of Ar gas, it is considered that the tension at the back surface of the molten metal is large, a thick, rounded shape of keyhole is formed, and the keyhole extends backward in the welding direction, then breaks and remains as a through hole.

The present invention was made based on the above findings and has as its gist the following method of production of a welded structure.

(1) A method of production of a welded structure by butt welding two steel sheets by laser welding while supplying assist gas to a melt pool surface characterized in that a thickness of at least one steel sheet of the two steel sheets is 0.6 mm or less, the assist gas is a mixed gas containing 10 to 50 vol % of $O_2$ gas, and, when an $O_2$ concentration in the assist gas is C (vol %), a flow rate L of assist gas (liter/min) is $30-C \leq L < 40$ and $L \geq 10$.

(2) The method of production of a welded structure according to (1), wherein when a welding speed is V (m/min), an average thickness of two steel sheets is "t" (mm), and a spot area of the laser is A (mm), an output of the laser is $1.42 \times V \times t \times A$ (kW) to $1.83 \times V \times t \times A$ (kW).

(3) The method of production of a welded structure according to (1) or (2), wherein a front surface melt width of a melt part of the two steel sheets is made 2.3 times or less a thickness of a thinner steel sheet among the two steel sheets and a back surface melt width is made 0.5 to 1.2 times the melt width of the front surface.

(4) The method of production of a welded structure according to any one of (1) to (3), wherein an $O_2$ concentration in the assist gas is 15 to 30 vol %.

(5) The method of production of a welded structure according to any one of (1) to (4), wherein the assist gas is air.

(6) The method of production of a welded structure according to any one of (1) to (5), wherein the assist gas is supplied to the melt pool surface so as to flow in a direction opposite to a weld advancing direction.

(7) The method of production of a welded structure according to (6), wherein the assist gas is supplied so as to intersect the melt pool surface.

(8) The method of production of a welded structure according to (6), wherein the assist gas is supplied so as to intersect the steel sheet in front of the melt pool in the weld advancing direction.

(9) The method of production of a welded structure according to any one of (1) to (8), wherein the welded structure is a tailored blank material.

Advantageous Effects of Invention

According to the present invention, even when butt welding a plurality of steel sheets including a thickness 0.6 mm or less steel sheet, it becomes possible to prevent the formation of a through hole at the melt part. Therefore, the welding method according to the present invention can be suitably used for production of a welded structure, in particular a tailored blank material.

DESCRIPTION OF EMBODIMENTS

Figure 1:
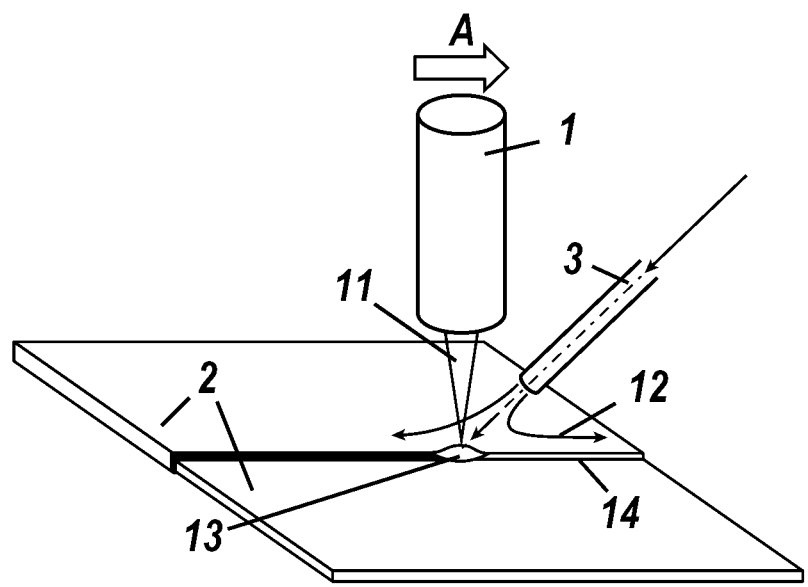
FIG. 1 is a view showing one example of a welding method according to the present invention.

The method of production of a welded structure of the present invention is one which supplies an assist gas to a melt pool surface while butting welding two steel sheets by laser welding. Below, the requirements of the present invention will be explained in detail.

(A) Supply of Assist Gas

In the method of production of a welded structure of the present invention, as the assist gas, a mixed gas containing $O_2$ gas is supplied to the melt pool surface. To stabilize the flow of the melt pool and prevent the formation of a through hole at the melt part, it is necessary to make the content of the $O_2$ gas in the mixed gas 10 to 50 vol %.

If the content of $O_2$ gas is high, the oxidation reaction becomes excessive and oxides discharged as slag become greater. As a result, the weld metal is liable to become recessed in shape. Therefore, the content of the $O_2$ gas in the mixed gas is preferably 30 vol % or less.

If the content of the $O_2$ gas is too low, a through hole will easily form. Furthermore, to stably broaden the melt width at the back surface side after welding, the content of the $O_2$ gas in the mixed gas is preferably 15 vol % or more.

The gas ingredients other than $O_2$ is not particularly limited. Ar, He, or other inert gas or $N_2$ gas, $CO_2$ gas, compressed air, etc. may be suitably used.

Further, as the assist gas, air containing $O_2$ gas in 21 vol % or so may be used. If using an assist gas comprised of air, the manufacturing cost can be kept low.

The supplying means of the assist gas is not particularly limited. For example, a usual nozzle having an ejection opening able to eject mixed gas in a predetermined direction may be used. The type of the nozzle is also not particularly limited. For example, a flat nozzle having a rectangular shaped ejection opening or a round pipe nozzle using a circular cross-section pipe etc. may be mentioned.

To prevent a through hole from forming in the melt part, it is preferable to supply the assist gas so that the weld metal is pushed to flow backward in the weld advancing direction. That is, at the melt pool surface, the assist gas ejected from the supplying means is preferably supplied so as to flow in a direction opposite to the weld advancing direction.

To achieve the above object, the assist gas is preferably supplied by directly blowing it toward the melt pool surface. That is, the ejection position and direction of the assist gas are preferably adjusted so that the centerline of the assist gas ejected from the supplying means intersects the melt pool surface.

To remove foreign matter etc. present at the abutted part of the steel sheets at the front of the melt pool in the weld advancing direction, the ejection position, direction and strength of the mixed gas may be adjusted so that the mixed gas blown on the steel sheets at the front of the melt pool in the weld advancing direction and reflected at the steel sheet back surface is supplied to the melt pool surface. That is, the supplying means may be placed so that the centerline of the assist gas ejected from the supplying means intersects the steel sheets in front of the melt pool in the weld advancing direction.

FIGS. 1 to 4 are views for explaining one example of a welding method according to the present invention. When using the laser 11 fired from the welding head 1 to weld the steel sheets 2, the supplying means 3 is used to supply the mixed gas 12. In FIG. 1, the supplying means 3 set in front of the welding head 12 in the weld advancing direction A directly blows assist gas 12 comprised of mixed gas to the melt pool 13.

Figure 2:
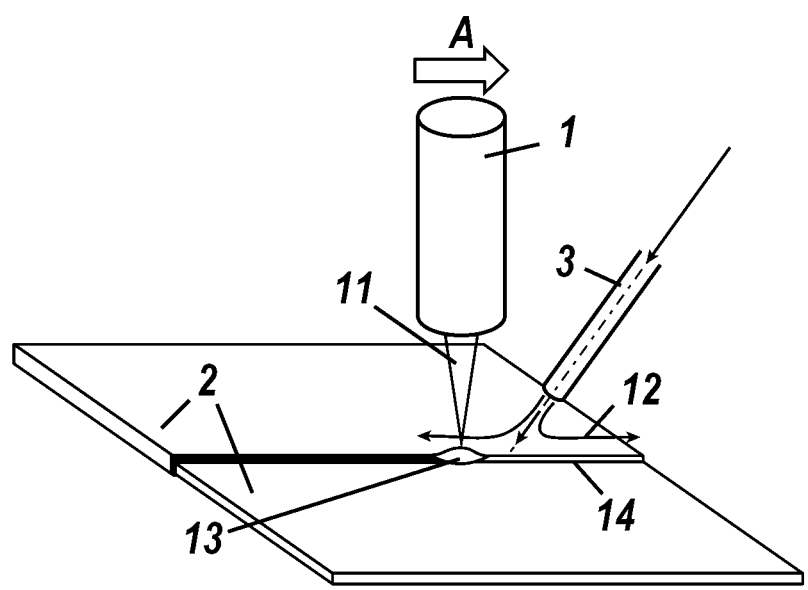
FIG. 2 is a view showing another example of a welding method according to the present invention.

In FIG. 2, in the same way as FIG. 1, a supplying means 3 is set in front of the welding head 1, but it is also possible to blow assist gas 12 toward the steel sheets 2 in front of the melt pool. The position of the supplying means 3 is adjusted so that the assist gas 12 reflected at the back surface of the steel sheet 2 is supplied to the back surface of the melt pool 13.

Figure 3:
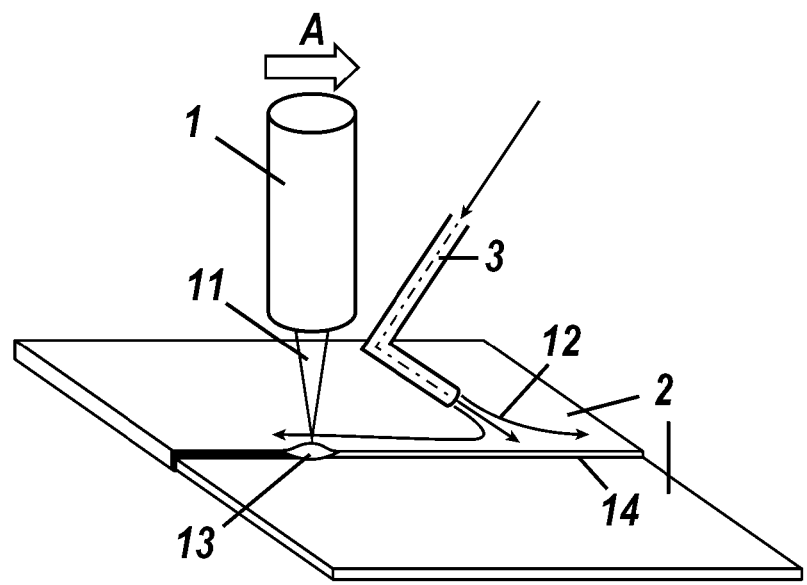
FIG. 3 is a view showing another example of a welding method according to the present invention.

As shown in FIG. 3, it is possible to place the supplying means 3 in front of the welding head 1, blow the assist gas 12 toward the front, then adjust the ejection position and ejection strength of the supplying means 3 so that the assist gas 12 reflected at the back surface of the steel sheets 2 is supplied to the back surface of the melt pool 13. By strongly blowing the mixed gas 12 toward the front of the weld advancing direction A from the melt pool 13, it becomes possible to remove the rust preventive oil, slag, spatter, etc. deposited at the abutted parts 14.

Figure 4:
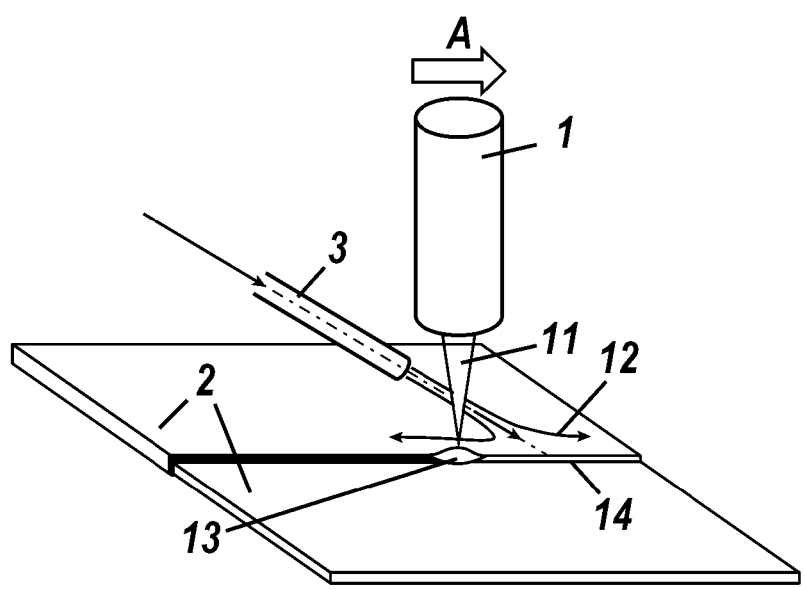
FIG. 4 is a view showing another example of a welding method according to the present invention.

As shown in FIG. 4, it is also possible to place the supplying means 3 behind the welding head 1, blow the mixed gas 12 toward the front, then adjust the ejection position and ejection strength of the supplying means 3 so that the mixed gas 12 reflected at the back surface of the steel sheets 2 is supplied to the back surface of the melt pool 13.

The flow rate L (liter/min) of the assist gas is made to satisfy L≥10 and 30−C≤L<40 when making the $O_2$ concentration C (vol %). The higher the concentration of oxygen, the smaller the flow rate may be. However, if the flow rate is too small, it becomes difficult for the gas to reach the molten metal and the function as an assist gas is no longer performed. If the flow rate is too large, the molten metal may melt down.

The blowing force F of the assist gas is preferably 0.001 to 0.025N. The blowing force of the assist gas can be found by $F=\rho Q^2/A$. Here, ρ is the density of the mixed gas, Q is the flow rate of mixed gas, and $A_P$ is a cross-sectional view of piping of mixed gas.

(B) Steel Sheet

The method of production of a welded structure of the present invention butt welds two steel sheets. As explained above, when butt welding a set of steel sheets including a steel sheet with a thickness of 0.6 mm or less, through holes easily form at the melt parts. The method of production of a welded structure of the present invention particularly exhibits its effect at the time of butt welding a set of sheets including a steel sheet with a thickness of 0.6 mm or less.

The type of steel to which the method of production of a welded structure of the present invention is applied is not particularly limited. It may be unplated steel sheet or may be hot dip galvanized steel sheet or other plated steel sheet. The tensile strength of the steel sheet is also not limited. 200 to 1900 MPa class steel sheet may be suitably used.

The difference in thicknesses of the steel sheets is not particularly limited. However, if the difference is too large, butt welding sometimes becomes difficult. Therefore, between the thicknesses of the two steel sheets, the thickness of the thicker side sheet is preferably 3 times or less the thinner side.

When using laser welding for butt welding, the clearance between the steel sheets is preferably made 0.1 mm or less. This is because if the clearance between the steel sheets is too large, weld defects are liable to occur. In accordance with need, it is possible to perform the welding while supplying filler wire.

(C) Laser Welding

In the method of production of a welded structure of the present invention, laser welding is used. The type of the laser oscillator is not particularly limited so long as able to generate a kW class laser. For example, a fiber laser, YAG laser, disk laser, semiconductor laser, $CO_2$ gas laser, or other oscillator can be used. If using the above oscillator, a high output laser can be obtained, so efficient welding becomes possible.

A smaller spot diameter of the laser at the welding position is stabler in flow of the melt pool. However, if too small, the clearance when made to abut falls and a good weldability is liable to no longer be obtained. If the spot diameter is too large, the welding speed falls and the front surface melt width becomes too broad, so this is not preferred. For this reason, the diameter is preferably made 0.5 to 0.7 mm. If applied to a rectangular shape or other spot other than a circle, the size in the direction intersecting the tangential direction is preferably made 0.5 to 0.7 mm/The welding speed is preferably 4 to 8 m/min considering the weld shape and productivity.

To obtain a good weld shape, the output of the laser is preferably made 1.42×V×t×A (kW) to 1.83×V×t×A (kW) where the welding speed is V (m/min), the average thickness of the two steel sheets is "t" (mm), and the spot area of the laser is A ($mm^2$). For example, the spot is preferably made a circle with a diameter of 0.6 mm. When welding a set of sheets with thicknesses of 0.5 mm and 1.0 mm by a welding speed of 6 m/min, it is preferably made 1.8 to 2.3 kW or so.

If the laser output is too low, the steel sheets are not sufficiently melt and the welding becomes insufficient. If the laser output is too large, the amount of flying spatter increases so this is not preferable.

Note that, the welding method of the present invention relates to butt welding two steel sheets, but it may also needless to say be used for the production of a tailored blank material having a plurality of melt parts where the two steel sheets are butt welded etc. (for example, a tailored blank material comprised of three sheets of a center steel sheet at the left and right of which steel sheets are butt welded).

(D) Melt Part

Figure 5:
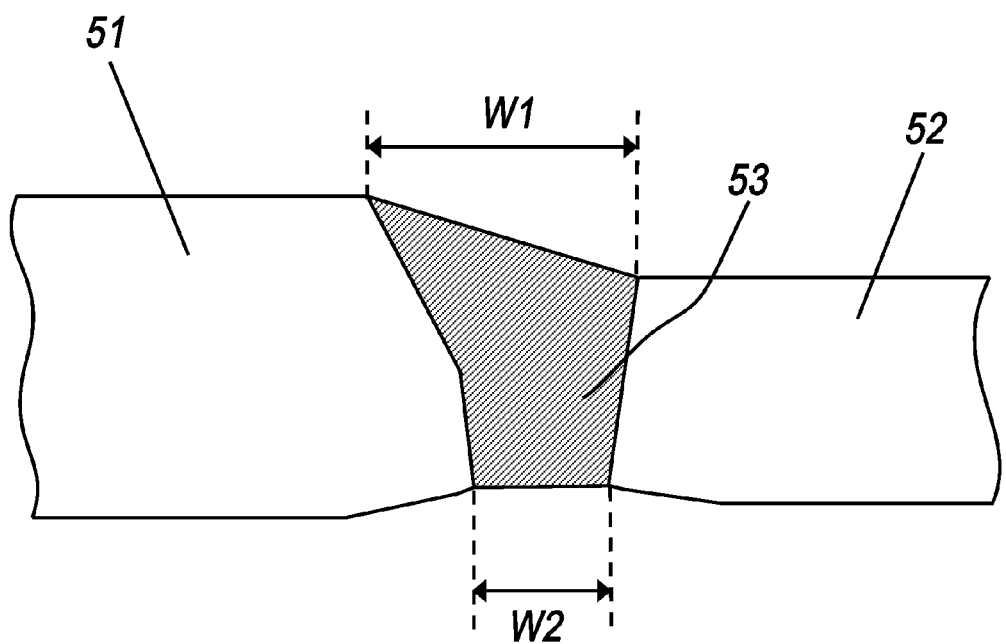
FIG. 5 is a view showing a front surface melt width and a back surface melt width of a welded structure.

The front surface melt width of the melt part is preferably made 2.3 times or less of the thickness of the thin steel sheet among the two steel sheets while the back surface melt width is preferably made 0.5 to 1.2 times the melt width of the front surface. If the front surface melt width becomes too large, the back surface of the melt part melts or the molten metal easily drips down, so this is not preferable. If the back surface melt width is too small, a sufficient strength cannot be secured. If too thick, the molten metal easily drips down, so this is not preferable. To make the melt part sufficiently strong, the back surface melt width is preferably 0.8 mm or more. Note that the front surface melt width is made W1 in FIG. 5, while the back surface melt width is made the length of W2.

EXAMPLES

Below, examples will be used to explain the present invention more specifically, but the present invention is not limited to these examples.

Example 1

270 MPa class cold rolled steel sheet with a thickness of 0.5 mm and 590 MPa class cold rolled steel sheet with a thickness of 1.0 mm were butt welded by a fiber laser.

The spot size of the laser was 0.6 mm and the welding speed was made a fixed 6 m/min. The shape of the nozzle supplying the assist gas was a circular cross-section pipe shape, while the inside diameter was 5.5 mm. The nozzle, as shown in FIG. 1, was set in front of the welding head. The distance between the tip of the nozzle and the steel sheets was made 15 mm, the angle formed by the steel sheets and nozzle was made 45°, and assist gas was blown.

The laser output was adjusted and the weldability was evaluated while changing the type of the assist gas. The welding conditions and results of evaluation are shown in Table 1.

TABLE 1

| Test no. | Gas type | Flow rate (liter/min) | 1.2 | 1.3 | 1.4 | 1.5 | 1.6 | 1.7 | 1.8 | 1.9 | 2.0 | 2.1 | 2.2 | 2.3 | 2.4 | 2.5 | 2.6 | 2.7 | 2.8 | 2.9 | Shape of weld metal |
|---|---|---|---|---|---|---|---|---|---|---|---|---|---|---|---|---|---|---|---|---|---|
| 1 | None | — | ◇ | ◇ | ◇ | ◇ | ◇ | 0.6 | 0.7 | 0.7 | 0.7 | ● | ● | ● | x | x | x | x | x | x | — |
| 2 | Ar | 20 | ◇ | ◇ | ◇ | ◇ | ◇ | 0.4 | x | x | x | x | x | x | x | x | x | x | x | x | — |
| 3 | $N_2$ | 20 | ◇ | ◇ | ◇ | ◇ | 0.4 | 0.5 | 0.6 | x | x | x | x | x | x | x | x | x | x | x | — |
| 4 | $CO_2$ | 20 | ◇ | 0.5 | 0.5 | 0.5 | 0.5 | 0.5 | 0.5 | 0.6 | 0.6 | x | x | x | x | x | x | x | x | x | — |
| 5 | Ar—5% $O_2$ | 20 | ◇ | ◇ | ◇ | ◇ | 0.4 | 0.4 | 0.5 | 0.5 | 0.6 | 0.7 | ● | ● | ● | x | x | x | x | x | — |
| 6 | Ar—10% $O_2$ | 20 | ◇ | ◇ | 0.4 | 0.5 | 0.5 | 0.5 | 0.6 | 0.6 | 0.7 | 0.8 | ● | ● | ● | ● | ● | ● | x | x | Good |
| 7 | Ar—15% $O_2$ | 20 | ◇ | 0.3 | 0.4 | 0.5 | 0.5 | 0.6 | 0.6 | 0.7 | 0.8 | 0.8 | 0.8 | 0.8 | ● | ● | x | x | x | x | Good |
| 8 | Ar—20% $O_2$ | 20 | ◇ | 0.4 | 0.5 | 0.6 | 0.7 | 0.7 | 0.8 | 0.8 | 0.9 | 0.9 | 0.9 | 0.9 | ● | ● | x | x | x | x | Good |
| 9 | Ar—30% $O_2$ | 20 | ◇ | 0.5 | 0.5 | 0.6 | 0.7 | 0.8 | 0.8 | 0.9 | 0.9 | 0.9 | 1.0 | 1.0 | ● | x | x | x | x | x | Good |
| 10 | Ar—50% $O_2$ | 20 | ◇ | 0.6 | 0.6 | 0.7 | 0.8 | 0.8 | 0.9 | 0.9 | 0.9 | 0.9 | 1.0 | 1.0 | x | x | x | x | x | x | Recessed |
| 11 | Ar—10% $CO_2$ | 20 | ◇ | ◇ | ◇ | 0.4 | 0.4 | 0.4 | 0.5 | 0.5 | 0.5 | 0.5 | 0.6 | x | x | x | x | x | x | x | — |
| 12 | Ar—20% $CO_2$ | 20 | ◇ | ◇ | ◇ | 0.5 | 0.5 | 0.5 | 0.5 | 0.5 | 0.5 | 0.5 | ● | x | x | x | x | x | x | x | — |
| 13 | Ar—30% $CO_2$ | 20 | ◇ | ◇ | 0.4 | 0.5 | 0.5 | 0.5 | 0.5 | 0.5 | 0.6 | 0.6 | ● | ● | x | x | x | x | x | x | — |
| 14 | Air | 20 | ◇ | ◇ | ◇ | 0.5 | 0.7 | 0.7 | 0.8 | 0.8 | 0.8 | 0.9 | 0.9 | 0.9 | 1.0 | ● | x | x | x | x | Good |

The numerical figures in Table 1 are the average values (mm) of the melt width at the back surface side. Under conditions where numerical figures are shown, the weld bead was formed down to the back surface side of the steel sheets without a through hole being formed. When the melt width at the back surface side was 0.8 mm or more, it was judged as a good result. The "◇" marks mean insufficient heat input resulted in the weld bead failing to be formed down to the back surface side. The "●" marks mean that the weld bead was formed down to the back surface side, but the melt width was unstable. The "x" marks mean through holes were formed.

As will be understood from Table 1, when not using an assist gas or when using Ar gas, $N_2$ gas, $CO_2$ gas, or a mixed gas of $CO_2$ gas and Ar gas, it was not possible to stably form a broad width weld bead.

On the other hand, when using an assist gas comprised of a mixed gas including $O_2$ gas, if the content of the $O_2$ gas is 10 to 50 vol %, it was possible to form a stable weld bead down to the back surface side without the formation of a through hole. In particular, if the content of the $O_2$ gas is 15 to 50 vol %, it was possible to sufficiently secure a suitable range of output. However, if using a mixed gas with a content of the $O_2$ gas of 50 vol %, the weld metal became slightly thin and became recessed in shape. Further, even when using assist gas comprised of air, good results were obtained. If the content of the $O_2$ gas is 5 vol %, a broad width weld bead could not be formed.

Example 2

In the same way as Example 1, the weldability was evaluated with the laser output set to 2.1 kW and the $O_2$ concentration in the assist gas and flow rate of the assist gas changed. The welding conditions and results of evaluation are shown in Table 2.

TABLE 2

| Test no. | Gas type | 5 liter/min | 10 liter/min | 20 liter/min | 30 liter/min | 40 liter/min |
|---|---|---|---|---|---|---|
| 21 | Ar | x | x | x | x | x |
| 22 | Ar—3% $O_2$ | x | x | 0.5~0.6 | x | x |
| 23 | Ar—5% $O_2$ | x | x | 0.7 | x | x |
| 24 | Ar—10% $O_2$ | x | 0.6 | 0.8 | 0.8 | x |
| 25 | Ar—15% $O_2$ | 0.6 | 0.7 | 0.8 | 0.8 | x |
| 26 | Ar—20% $O_2$ | 0.7 | 0.8 | 0.9 | 0.9 | x |
| 27 | Ar—30% $O_2$ | 0.7 | 0.8 | 0.9 | 1.0 | x |
| 28 | Ar—50% $O_2$ | 0.7 | 0.8 | 0.9 | 1.0 | x |

The numerical figures in Table 2 are the average values (mm) of the melt width at the back surface side. Under conditions where numerical figures are shown, the weld bead was formed down to the back surface side of the steel sheet without a through hole being formed. The "x" marks mean through holes were formed.

As will be understood from Table 2, when the $O_2$ concentration in the mixed gas was made C (vol %), when the flow rate L (liter/min) of the mixed gas satisfied $L \geq 10$ and $30 - C \leq L < 40$, good results were obtained.

INDUSTRIAL APPLICABILITY

According to the present invention, even when butt welding a plurality of steel sheets including a steel sheet with a thickness of 0.6 mm or less, it becomes possible to prevent the formation of a through hole at the melt part. Therefore, the welding method according to the present invention can be suitably used for producing a welded structure, in particular a tailored blank material.

REFERENCE SIGNS LIST 1. welding head
2. steel sheet
3. supplying means
11. laser
12. mixed gas
13. melt pool
14. abutted part
A. weld advancing direction
51. steel sheet
52. steel sheet
53. melt part
W1. front surface melt width
W2. back surface melt width

The invention claimed is:

1. A method of producing a welded structure comprising the steps of:
   butt welding two steel sheets by laser welding, and
   supplying assist gas to a melt pool surface during said butt welding,
      wherein a thickness of at least one steel sheet of said two steel sheets is 0.6 mm or less,
      said assist gas is a mixed gas containing 10 to 50 vol % of $O_2$ gas;
      when the $O_2$ concentration in said assist gas is C (vol %), a flow rate L of assist gas (liter/min) is $$30 - \frac{C}{1\ vol\ \%} \leq \frac{L}{1\ \text{liter/min}} < 40, \text{ and } \frac{L}{1\ \text{liter/min}} \geq 10;$$

and
      when a welding speed is V (m/min), an average thickness of two steel sheets is "t" (mm), and a spot area of the laser is A (mm²), an output of the laser is $$1.45\ \text{kW} \times \frac{V}{1\ m/\text{min}} \times \frac{t}{1\ \text{mm}} \times \frac{A}{1\ \text{mm}^2}$$

$$\text{to } 1.83\ \text{kW} \times \frac{V}{1\ m/\text{min}} \times \frac{t}{1\ \text{mm}} \times \frac{A}{1\ \text{mm}^2}.$$

2. The method of producing the welded structure according to claim 1, wherein a front surface melt width of a melt part of said two steel sheets is made 2.3 times or less a thickness of a thinner steel sheet among the two steel sheets and a back surface melt width is made 0.5 to 1.2 times the melt width of the front surface.

3. The method of producing the welded structure according to claim 2, wherein the $O_2$ concentration in said assist gas is 15 to 30 vol %.

4. The method of producing the welded structure according to claim 2, wherein said assist gas is air.

5. The method of producing the welded structure according to claim 2, further comprising, supplying said assist gas to said melt pool surface so as to flow in a direction opposite to a weld advancing direction.

6. The method of producing the welded structure according to claim 1, wherein the $O_2$ concentration in said assist gas is 15 to 30 vol %.

7. The method of producing the welded structure according to claim 6, wherein said assist gas is air.

8. The method of producing the welded structure according to claim 6, further comprising, supplying said assist gas to said melt pool surface so as to flow in a direction opposite to a weld advancing direction.

9. The method of producing the welded structure according to claim 1, wherein said assist gas is air.

10. The method of producing the welded structure according to claim 9, further comprising, supplying said assist gas to said melt pool surface so as to flow in a direction opposite to a weld advancing direction.

11. The method of producing the welded structure according to claim 1, further comprising, supplying said assist gas to said melt pool surface so as to flow in a direction opposite to a weld advancing direction.

12. The method of producing the welded structure according to claim 11, further comprising, supplying said assist gas so as to intersect the melt pool surface.

13. The method of producing the welded structure according to claim 11, further comprising, supplying said assist gas so as to intersect the steel sheet in front of said melt pool in the weld advancing direction.

14. The method of producing the welded structure according to claim 1, wherein said welded structure is a tailored blank material.

* * * * *